(12) United States Patent
Oami et al.

(10) Patent No.: US 8,879,004 B2
(45) Date of Patent: Nov. 4, 2014

(54) HIGH-QUALITY CONTENT GENERATION SYSTEM, METHOD THEREFOR, AND PROGRAM

(75) Inventors: Ryoma Oami, Tokyo (JP); Kota Iwamoto, Tokyo (JP); Takami Sato, Tokyo (JP); Yasufumi Hirakawa, Tokyo (JP); Yuzo Senda, Tokyo (JP); Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 897 days.

(21) Appl. No.: 13/001,378

(22) PCT Filed: Jun. 16, 2009

(86) PCT No.: PCT/JP2009/060909
§ 371 (c)(1),
(2), (4) Date: Mar. 9, 2011

(87) PCT Pub. No.: WO2009/157340
PCT Pub. Date: Dec. 30, 2009

(65) Prior Publication Data
US 2011/0149169 A1 Jun. 23, 2011

(30) Foreign Application Priority Data
Jun. 26, 2008 (JP) .................................. 2008-167345

(51) Int. Cl.
*H04N 5/38* (2006.01)
*H04N 21/61* (2011.01)
(Continued)

(52) U.S. Cl.
CPC ................ *H04N 5/91* (2013.01); *H04N 9/7921* (2013.01); *H04N 21/6125* (2013.01);
(Continued)

(58) Field of Classification Search
USPC .............................................. 348/14.12, 723
See application file for complete search history.

(56) References Cited

U.S. PATENT DOCUMENTS 5,724,453 A * 3/1998 Ratnakar et al. ............... 382/251
5,920,657 A * 7/1999 Bender et al. .................. 382/284
(Continued)

FOREIGN PATENT DOCUMENTS

CN 101021857 A 8/2007
EP 1990996 A1 11/2008
(Continued)

OTHER PUBLICATIONS

Michael Goesele, et al., "Multi-View Stereo for Community Photo Collections", Computer Vision, 2007. ICCV 2007. IEEE 11th International Conference 0 N, IEEE, PI, Oct. 1, 2007, pp. 1-8, XP031194422, DOI: 10.1109/ICCV.2007.4409200, ISBN: 978-1-4244-1630-1.

(Continued)

*Primary Examiner* — Sath V Perungavoor
*Assistant Examiner* — Jeffery Williams
(74) *Attorney, Agent, or Firm* — Sughrue Mion, PLLC

(57) ABSTRACT

A high-quality content generating system provided with a feature amount extracting means for extracting the feature amounts of a plurality of pieces of content therefrom, a content grouping means for performing matching between the feature amounts of the plurality of pieces of content extracted by the feature amount extracting means, grouping the same content included in the plurality of pieces of content and the derived content produced by using the same content, and calculating same/derived content grouping information, and a high-quality content generating means for selecting pieces of content to be grouped by the same/derived content grouping information from the plurality of pieces of content and generating content with higher quality by using the selected content.

26 Claims, 10 Drawing Sheets

(51) Int. Cl.
*H04N 21/462* (2011.01)
*G11B 27/034* (2006.01)
*H04N 21/845* (2011.01)
*H04N 7/173* (2011.01)
*G11B 27/036* (2006.01)
*H04N 21/482* (2011.01)
*G11B 27/10* (2006.01)
*H04N 5/91* (2006.01)
*H04N 9/79* (2006.01)
*H04N 9/82* (2006.01)

(52) U.S. Cl.
CPC .......... *H04N 21/4622* (2013.01); *G11B 27/034* (2013.01); *H04N 21/8456* (2013.01); *G11B 2220/2516* (2013.01); *H04N 7/17318* (2013.01); *G11B 27/036* (2013.01); *H04N 21/482* (2013.01); *H04N 21/4828* (2013.01); *H04N 9/8205* (2013.01); *G11B 27/105* (2013.01)
USPC ........................................ 348/723; 348/14.12

(56) References Cited

U.S. PATENT DOCUMENTS 5,953,506 A * 9/1999 Kalra et al. ................... 709/231
6,744,922 B1 * 6/2004 Walker .......................... 382/190
6,816,551 B1   11/2004 Kasutani
6,870,957 B1    3/2005 Kasutani
6,982,762 B1 *  1/2006 Hui .............................. 348/405.1
2006/0083315 A1  4/2006 Sato et al.
2007/0041664 A1 * 2/2007 Yamada ........................ 382/299
2009/0320081 A1 * 12/2009 Chui et al. ..................... 725/93

FOREIGN PATENT DOCUMENTS

| | | |
|---|---|---|
| JP | 2000-259832 A | 9/2000 |
| JP | 2000-339474 A | 12/2000 |
| JP | 2003-333484 A | 11/2003 |
| JP | 2005-159419 A | 6/2005 |
| JP | 2006-115264 A | 4/2006 |
| WO | 2004/061545 A2 | 7/2004 |

OTHER PUBLICATIONS

Communication from the European Patent Office issued Jul. 11, 2012 in counterpart European Application No. 09770050.4.

Office Action dated Feb. 4, 2013 issued by the State Intellectual Property Office of People's Republic of China in counterpart Chinese Application No. 200980124217.0.

* cited by examiner

HIGH-QUALITY CONTENT GENERATION SYSTEM, METHOD THEREFOR, AND PROGRAM

CROSS REFERENCE TO RELATED APPLICATIONS

This application is a National Stage of International Application No. PCT/JP2009/060909 filed Jun. 16, 2009, claiming priority based on Japanese Patent Application No. 2008-167345 filed Jun. 26, 2008, the contents of all of which are incorporated herein by reference in their entirety.

TECHNICAL FIELD

The present invention relates to a high-quality content generation system, and a method and a program therefor.

BACKGROUND ART

Recently, many video hosting sites are rising, and the environment in which various videos can be viewed via Internet is being arranged. In this circumstance, the identical contents such as video images for promotion that should be positively distributed, and the identical topical contents are repeatedly contributed to various video hosting sites in some cases. Usually, any video site provides a function of retrieving the contents within its own site, and recently, retrieval engines capable of retrieving the contents striding over a plurality of the sites are also coming onstage. Cross-sectionally searching a plurality of the video image hosting sites by using this retrieval engine allows the identical contents to be found in a plural number in some cases.

In this circumstance, it is enough for a user to find one of the contents that the user desires to catch, thus, the user desiring to view the contents at a high quality has the following problem.

SUMMARY OF INVENTION

Technical Problem

A first controversial problem is that it is difficult to find the high-quality contents.

The reason is that a possibility that moderately selecting and viewing one of the contents found in the retrieval leads to catching the low-quality contents is high. With the case of the video hosting site, individual contents are often encoded at a high reduction rate because a large volume of the contents are handled. For this, a possibility of catching the low-quality contents is high because there are many contents of which the image quality is low in an original status. As a result, the user desiring to view the contents at a high quality has to search for the high-quality one by viewing the identical contents plurally found one by one, or has to resignedly put up with viewing of the contents of which the reproduction quality is poor due to time restriction etc. notwithstanding desiring to view the high-quality contents when the image quality of the accidentally viewed content is poor.

A second controversial problem is that it is difficult for the user to view the high-quality content in all sections.

The reason is that even though the retrieval allows a plurality of the identical contents to be found, the content to be viewed by the user is only one of them. It is not true that the image quality of a certain content is always excellent from beginning to end. For example, VBR coding at a low rate causes a large quantity of buffering to be produced, thereby making it difficult to take a control thereof. In such a case, it is not always true that the high quality can be kept in all sections. For this, it is not usually carried out to switch the content that the user is viewing to the other identical content even though the location in which the quality declines halfway exists for the reason that the time and labor are required, the viewing is interrupted, or the like. For this, even though the quality declines halfway, the user has no chance but resignedly putting up with a decline in the quality.

Thereupon, the present invention has been accomplished in consideration of the above-mentioned problems, and an object thereof is to provide a high-quality content generation system capable of, when the identical contents and the contents derived from them exist in a plural number, generating the higher-quality contents by employing them, and a method and a program therefor.

Solution to Problem

The present invention for solving the above-mentioned problems is a high-quality content generation system including: a feature extraction means for extracting features of contents from a plurality of the contents; a content grouping means for collating the features of a plurality of the contents extracted by the foregoing feature extraction means with each other, grouping the identical contents and the derived contents produced by using the above identical contents to be included in the foregoing plurality of the contents, and calculating identical/derived content grouping information; and a high-quality content generation means for selecting the contents to be grouped with the foregoing identical/derived content grouping information from among the foregoing plurality of the contents, and generating the contents of which a quality is more excellent by employing the selected contents.

The present invention for solving the above-mentioned problems is a high-quality content generation method including: a feature extraction step of extracting features of contents from a plurality of the contents; a content grouping step of collating the features of the foregoing plurality of the extracted contents with each other, grouping the identical contents and the derived contents produced by using the above identical contents to be included in the foregoing plurality of the contents, and calculating identical/derived content grouping information; and a high-quality content generation step of selecting the contents to be grouped with the foregoing identical/derived content grouping information from among the foregoing plurality of the contents, and generating the contents of which a quality is more excellent by employing the selected contents.

The present invention for solving the above-mentioned problems is a high-quality content generation program for causing an information processing apparatus to execute: a feature extraction process of extracting features of contents from a plurality of the contents; a content grouping process of collating the features of the foregoing plurality of the extracted contents with each other, grouping the identical contents and the derived contents produced by using the above identical contents to be included in the foregoing plurality of the contents, and calculating identical/derived content grouping information; and a high-quality content generation process of selecting the contents to be grouped with the foregoing identical/derived content grouping information from among the foregoing plurality of the contents, and generating the contents of which a quality is more excellent by employing the selected contents.

Advantageous Effect of Invention

The present invention is capable of, when the identical contents and the contents derived from them exist in a plural number, generating the higher-quality contents by employing them.

DESCRIPTION OF EMBODIMENTS

The high-quality content generation system of the exemplary embodiment of the present invention is characterized in including: a feature extraction means (100 of FIG. 1) for extracting the features of the contents from a plurality of the contents; a content grouping means (101 of FIG. 1) for collating the features of a plurality of the contents extracted by the feature extraction means with each other, obtaining the identical contents and the derived contents produced by using the above identical contents to be included in a plurality of the contents, grouping the identical/derived contents, and calculating identical/derived content grouping information; and a high-quality content generation means (102 of FIG. 1) for selecting the contents to be grouped with the foregoing identical/derived content grouping information from among the foregoing plurality of the contents, and generating the higher-quality contents by employing the selected contents. Employing such a configuration, grouping the identical/derived contents in terms of a plurality of the contents, generating the high-quality contents by employing these, and presenting them to the user makes it possible to accomplish an object of the present invention.

Next, the exemplary embodiments of the present invention will be explained in details by making a reference to the accompanied drawings.

Figure 1:
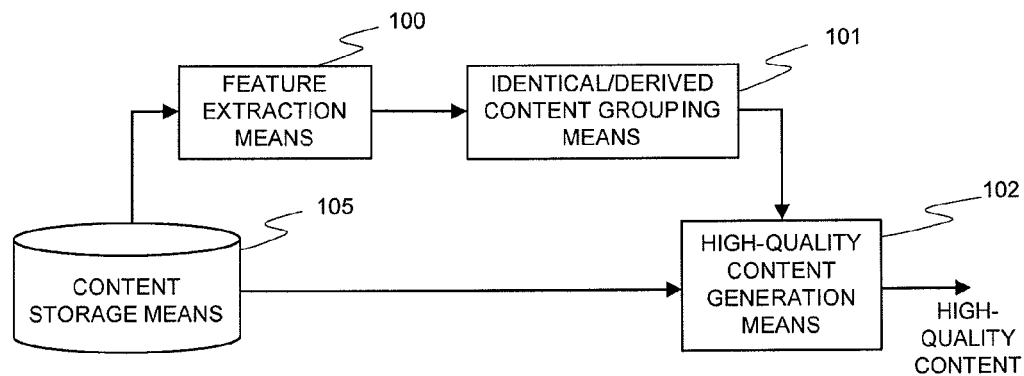
FIG. 1 is a block diagram illustrating the high-quality content generation system in a first exemplary embodiment.

FIG. 1 is a block diagram illustrating the high-quality content generation system in the first exemplary embodiment.

Upon making a reference to FIG. 1, the high-quality content generation system of the first exemplary embodiment is configured of a feature extraction means 100, an identical/derived content grouping means 101, a high-quality content generation means 102, and a content storage means 105.

The content storage means 105, which stores a plurality of the contents, is connected to the feature extraction means 100 and the high-quality content generation means 102. The feature extraction means 100, into which the contents are inputted from the content storage means 105, obtains the features for the contents and outputs the features to the identical/derived content grouping means 101. The identical/derived content grouping means 101, into which the features of the contents to be outputted from the feature extraction means 100 are inputted, obtains content link information representing a link relation between the features, and outputs it as grouping information to the high-quality content generation means 102. The high-quality content generation means 102, into which the grouping information is inputted from the identical/derived content grouping means 101, and the contents are inputted from the content storage means 105, respectively, generates and outputs the high-quality contents.

Next, an operation of the high-quality content generation system of this exemplary embodiment will be explained.

The contents are stored in the content storage means 105. Herein, the so-called content refers, for example, to a digitalized multimedia content, and the digitalized pictures, video and music, a combination thereof, and the like fall under the content. Additionally, the content could be not only a content produced by a professional such as a broadcast program, but also a so-called CGM (Consumer Generated Media), being a content produced by a consumer. Hereinafter, while the video image content is basically specialized for explanation, the situation is also similarly applicable to the music, the picture, and the like.

Further, while, for convenience, the content storage means 105 was explained in such a manner that the contents were stored in one location, the contents may be dispersedly stored in a plurality of the storages. For example, in a plurality of the video image hosting sites over Internet, the video image contents may be stored for each site. Further, also in each site, the contents may be dispersed and stored in a plurality of the storages. The contents stored in the content storage means 105 are inputted into the feature extraction means 100.

The feature extraction means 100 performs the feature extraction for each of the contents to be inputted. With the case of the picture, the feature is a visual feature such as color, pattern, and shape, and for example, the feature standardized by ISO/IEC 15938-3 can be employed. With the case of the music, the feature is an audio feature such as a power and a frequency component of sound, and for example, the feature standardized by ISO/IEC 15938-4 can be employed. With case of the video, besides the foregoing visual feature, the visual feature expressive of motion can be also employed, and the feature standardized by ISO/IEC 15938-3 can be employed. Further, the foregoing audio feature may be employed, and both of the visual feature and the audio feature may be employed. The extracted feature of each of the contents is outputted to the identical/derived content grouping means 101.

The identical/derived content grouping means 101 collates the features of the contents to be inputted with each other, regards the contents of which the similarity between the features is large as contents each having identical details, and groups them. Specifically, the identical/derived content grouping means 101 calculates the similarity (or a distance) between the features of certain two contents, and groups the above two contents when the similarity is equal to or more than a threshold (equal to or less than a threshold with the case of the distance).

Figure 2:
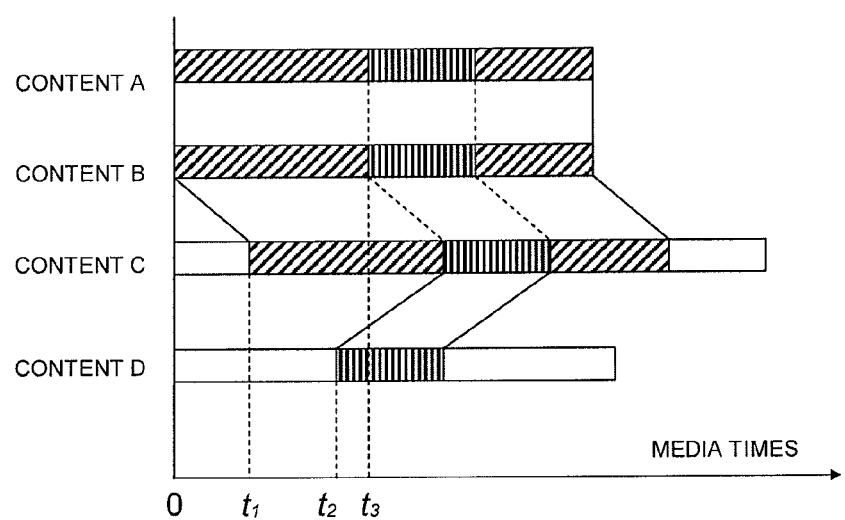
FIG. 2 is a view illustrating one example of grouping the contents each having a time axis.

At the moment of calculating the similarity, with the case of the picture, comparing the features with each other in terms of the entirety of the picture and performing the similarity calculation makes it possible to group the identical pictures. Further, the similarity may be calculated by collating region partners of one part of the picture with each other. In this case, the other images that can be obtained by using a certain picture (for example, the images that can be obtained by framing the picture, and the images that can be obtained by affixing a certain picture to another picture), namely, the derived contents can be also grouped. On the other hand, with the case of the contents each having a time axis such as the video and the music, the identical/derived content grouping means 101 groups the contents in terms of each time section (a section length is arbitrary). For example, when it is assumed that a collation between each of a content A, a content B, a content C and a content D, and the other is carried out as shown in FIG. 2, the time section partners shown with oblique striped lines are grouped, and the time section partners shown with vertical striped lines are grouped. The grouping information obtained in such a manner is outputted to the high-quality content generation means 102.

The high-quality content generation means 102 generates the high-quality contents from the grouping information to be inputted and the correspondence contents. For example, with the case of an example of FIG. 2, the high-quality content generation means 102 generates the high-quality contents by employing a content A, a content B, a content C, and a content D. The details of this generation will be described later.

Next, an operation of the high-quality content generation system of this exemplary embodiment will be explained by employing a flowchart.

Figure 3:
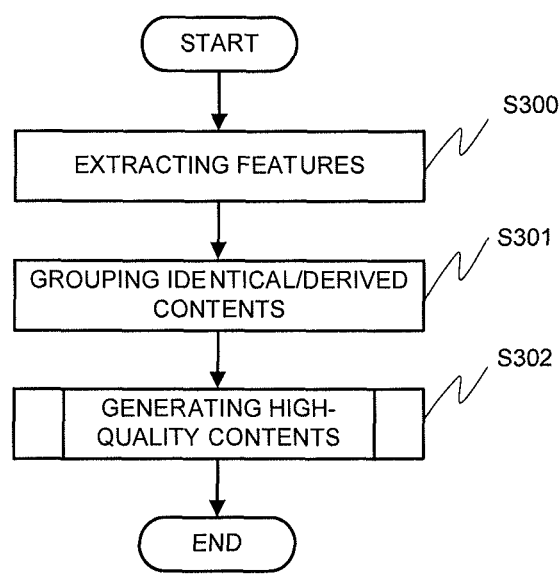
FIG. 3 is a flowchart illustrating a flow of the entirety of a process of the high-quality content generation system of the first exemplary embodiment.

FIG. 3 is a flowchart representing a flow of the entirety of a process of the high-quality content generation system in the first exemplary embodiment.

At first, in a step S300, the by-content feature is extracted. The details of the extraction are ones described in the feature extraction means 100. Next, in a step S301, the extracted features are collated in terms of the content, the contents are grouped, and the grouping information is obtained. The details of the grouping are ones described in the identical/derived grouping means 101. And, in a step S302, the high-quality contents are generated from the grouping information and the contents.

Next, an operation of the first exemplary embodiment of the high-quality content generation means 102 will be described in details while a reference to figures is made.

Figure 4:
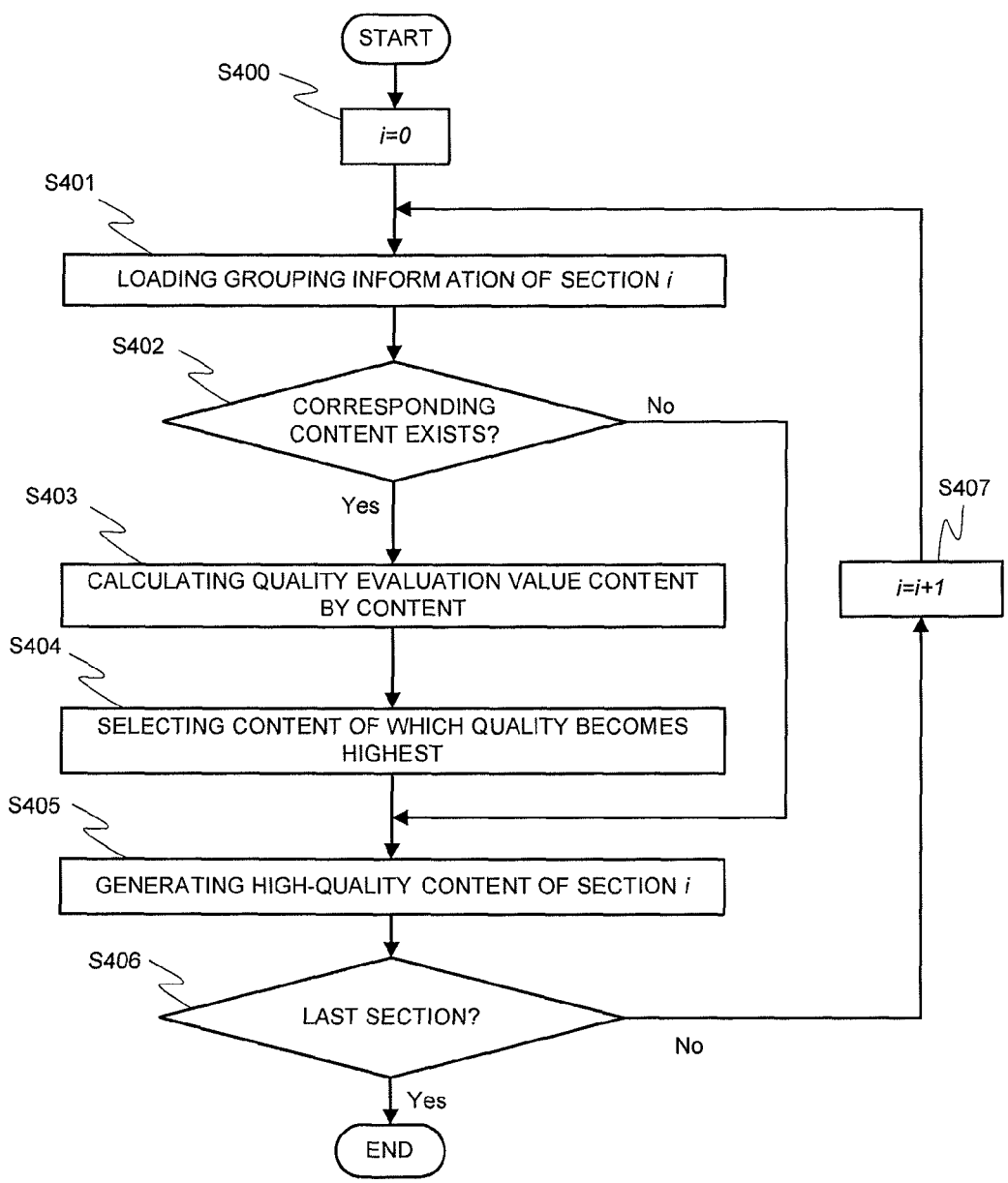
FIG. 4 is a flowchart illustrating a flow of the first exemplary embodiment of a high-quality content generation means 102.

FIG. 4 is a flowchart representing a flow of the first exemplary embodiment of the high-quality content generation means 102.

At first, it is assumed that indexes of time sections of the content, being a target for generating the high-quality contents, are represented as i=0, 1, . . . , N−1. That is, it is assumed that the content, being a target for generating the high-quality contents, is divided N time sections (N is an arbitrary natural number), and the high-quality contents are generated section by section.

In a flowchart, at first, in a step S400, i, being an index of the section, is set as zero.

Next, in a step S401, the grouping information associated with the section i is loaded. For example, with the case of an example of FIG. 2, information of a correspondence relation such that, when i belongs to the part shown with oblique lines, the contents A, B, and C are grouped correspondingly to each other, and while no offset in a time direction exists between the contents A and B, the content C is offset by $t_1$ in the time direction is obtained from the grouping information.

Next, in a step S402, it is investigated whether the corresponding content exists. With the case of the section in which only one correspondent content exists, the operation jumps to step S405 because it is necessary to generate the high-quality content, being an output of the above content alone. On the other hand, when the correspondent contents exist like an example of FIG. 2, the operation proceeds to the next step, namely S403.

In the step S403, a quality evaluation value in the time section corresponding to the section i is calculated for each of the contents caused to correspond to each other. Herein, the methods of calculating the quality evaluation value exist in a plural number, and the details thereof will be described later.

In the next step, namely S404, the quality evaluation values obtained in the step S403 are compared with each other in terms of the content to select the content of which the quality becomes highest.

In a step S405, the part corresponding to the section i of the selected content is copied to a buffer for the outputting. And, the above part is encoded in an appropriate output format. Additionally, with regard to the encoding of the above part in the output format, after generating plural section portions of the high-quality contents, the above part may be encoded in the output format together with them.

Next, in a step S406, it is investigated whether the section i is a last section, and when the section i is not a last section, an index i of the section is increased by one (1) and the operation returns to the step S401. When the section i is a last section, the process is finished.

In such a manner, the high-quality contents can be generated. Additionally, so far, the case that the content of which the quality became highest was selected for each time section of the content and the high-quality contents were generated was described. The above section may include one frame. That is, the quality may be evaluated frame by frame to generate the high-quality contents. Or, each frame may be divided into a plurality of regions to change the content of which the quality becomes highest region by region by judging the quality for each of these regions. For example, the frame may be divided into a plurality of blocks to evaluate the quality for each block unit. This enables the finer high-quality contents to be generated. However, in a time-spatial boundary in which a changeover to the content that is to be selected is made, a transition process may be performed so that both are smoothly changed in the adjacent of the boundary because an unnatural gap between the content qualities occurs in some cases.

Next, the details of the method of calculating the quality evaluation value in the step S403 will be described.

At first, the case of calculating the quality evaluation value from a bit amount to be assigned to the section i and a coding method will be described. In this case, firstly, the generated code quantity in the time section caused to correspond to the section i of each of the corresponding content are investigated. The value that becomes larger as the generated code quantity become larger is defined as the quality evaluation value because, as a rule, it can be said safely that the more the generated code quantity, the higher the image quality. However, when a coding structure of each content that is caused to correspond to the section i differs (for example, when the number etc. of the I pictures and P pictures differs), the above difference may be taken into consideration at the moment of calculating the quality evaluation value. Further, when the coding method differs, the generated code quantity of the contents each having an identical quality differ from each other. For example, as a rule, the content encoded with H.264 is more excellent in the quality as compared with the content encoded with MPEG-1 even though each has the identical generated code quantity. The quality evaluation value may reflect the characteristic caused by such a difference of the coding method. Additionally, how to control the quality evaluation value responding to a difference of the coding method and a difference of the coding structure can be decided, for example, by encoding the identical content with the various methods and investigating a relation with the image quality. Needless to say, a framework of machine learning may be employed in this stage.

Next, the case of evaluating magnitude of coding noise and calculating the quality evaluation value will be described. In this case, the image quality of the images that is obtained by decoding the time section caused to correspond to the section i of each of the corresponding contents is checked. For example, by employing the method of Literature 1 (JP-P2005-159419A "APPARATUS AND METHOD OF PROCESSING IMAGE, COMPUTER PROGRAM AND COMPUTER-READABLE STORAGE MEDIUM"), the coding noise can be quantified.

Needless to say, the method of measuring the coding noise is not limited hereto, and any arbitrary method, which enables the image quality to be determined by employing only decoded images without employing the original images, may be used. At this moment, the quality evaluation value may be defined in such a manner that the quality evaluation value becomes smaller as the coding noise becomes larger, and employed.

Or, the image quality may be evaluated by employing a parameter of quantization. Extracting the coding parameter associated with the quantization from the content makes it possible to evaluate the quality because coarse quantization causes the image quality to decline as a rule. At this moment, the quality evaluation value may be defined in such a manner that the quality evaluation value becomes smaller as the quantization parameter becomes larger, and employed.

When a resolution differs between the contents caused to correspond to each other, the quality may be evaluated by employing the resolution. The quality evaluation value may be defined in such a manner that the quality evaluation value becomes larger as the resolution becomes larger, and employed because, as a rule, it can be said safely that the larger the resolution, the higher the image quality.

Further, when a frame rate differs between the contents caused to correspond to each other, the quality may be evaluated by employing the frame rate. The quality evaluation value may be defined in such a manner that the quality evaluation value becomes larger as the frame rate becomes higher, and employed because the higher the frame rate, the more smooth the motion, which leads to an improvement in the quality of the video.

While the methods of obtaining the quality evaluation value based upon individual factors were described above, the quality evaluation value incorporating these factors in a plural number may be defined and employed.

The above is an operation of the high-quality content generation means 102 based upon a flowchart shown in FIG. 4.

Next, an operation of the second exemplary embodiment of the high-quality content generation means 102 will be explained in details while a reference to figures is made.

Figure 5:
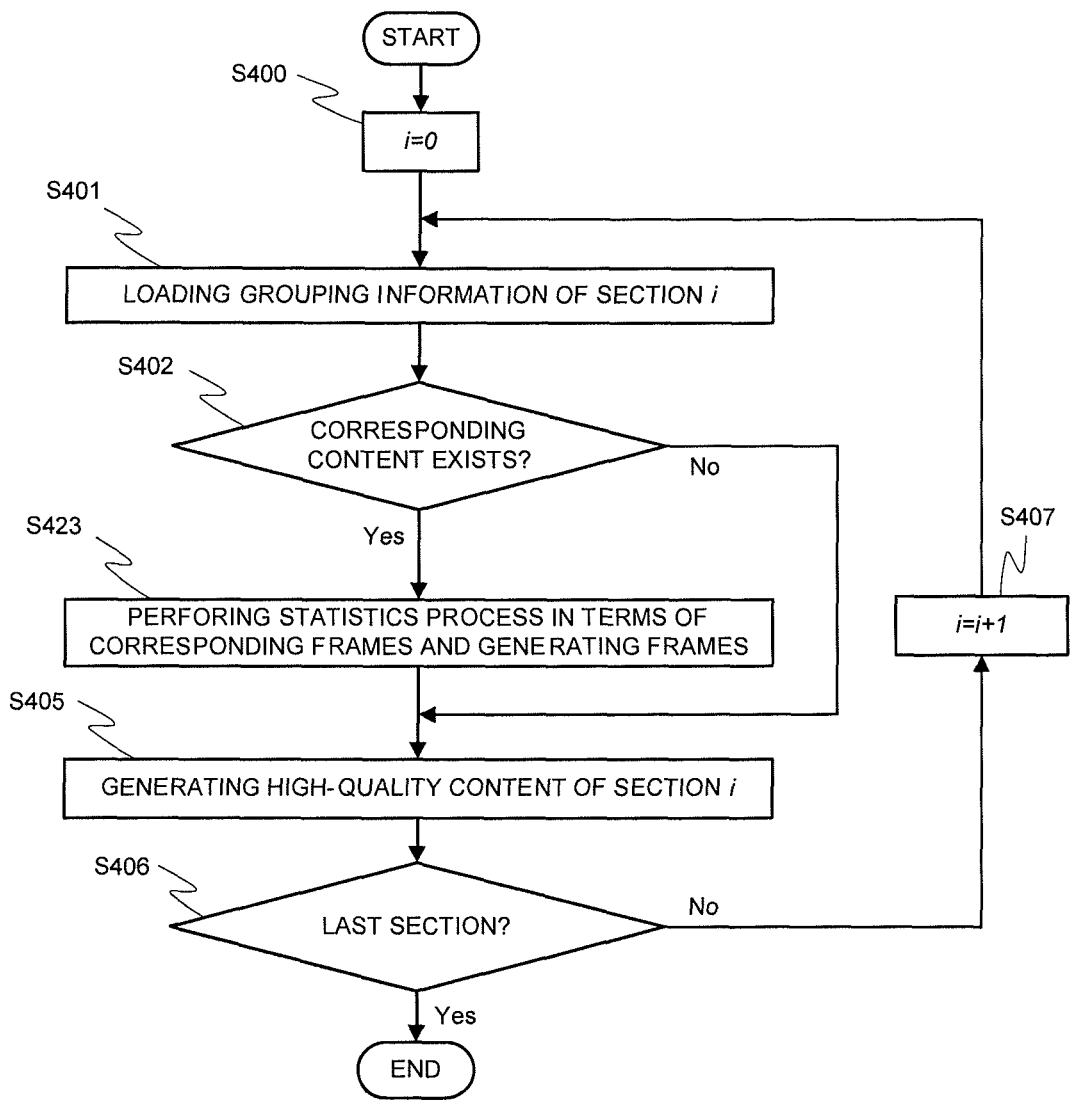
FIG. 5 is a flowchart illustrating a flow of a second exemplary embodiment of the high-quality content generation means 102.

FIG. 5 is a flowchart representing a flow of the process of the second exemplary embodiment of the high-quality content generation means 102. Basically, a step S423 is included therein instead of the step S403 and the step S404 of FIG. 4. The steps other than it are identical to that of a flowchart of FIG. 4, so the step S423 will be described below.

In the step S423, the frame to be outputted is generated by performing a statistics process for pixel values in terms of the corresponding frames of the contents caused to correspond to each other. For example, by averaging the values of the pixels existing in identical pixel positions in terms of the frames of a plurality of the contents caused to correspond to each other, the pixel value in the above pixel position of the output frame is calculated. Averaging the pixel values in such a manner makes it possible to offset noise components contained in the individual contents and to enhance the quality of the output frame.

Or, instead of employing the method of simply averaging the pixel values, the method may be used of obtaining the pixel value by excluding outliers like an M-estimation method. For example, when the content of which the pixel value largely differs exists, the pixel value of the output frame may be obtained by excluding the pixel value of the above content and averaging the remaining pixel values. In this case, for example, also when the frame is caused to correspond to the derived content having telop inserted therein, the output frame can be calculated without an influence by the above telop received.

Or, the statistics process may be performed by calculating the quality evaluation value content by content described in the explanation in the step S403 with a flowchart of FIG. 3, or by employing only the quality evaluation values satisfying a certain constant criteria. This can exclude an influence by the content of which the quality is extremely low.

When the content of which the resolution differs is included, the statistics process may be performed after carrying out an interpolation so as to meet the resolution of the output frame.

The above is an operation of the high-quality content generation means 102 based upon a flowchart shown in FIG. 5.

Next, an operation of the third exemplary embodiment of the high-quality content generation means 102 will be explained in details while a reference to figures is made.

Figure 6:
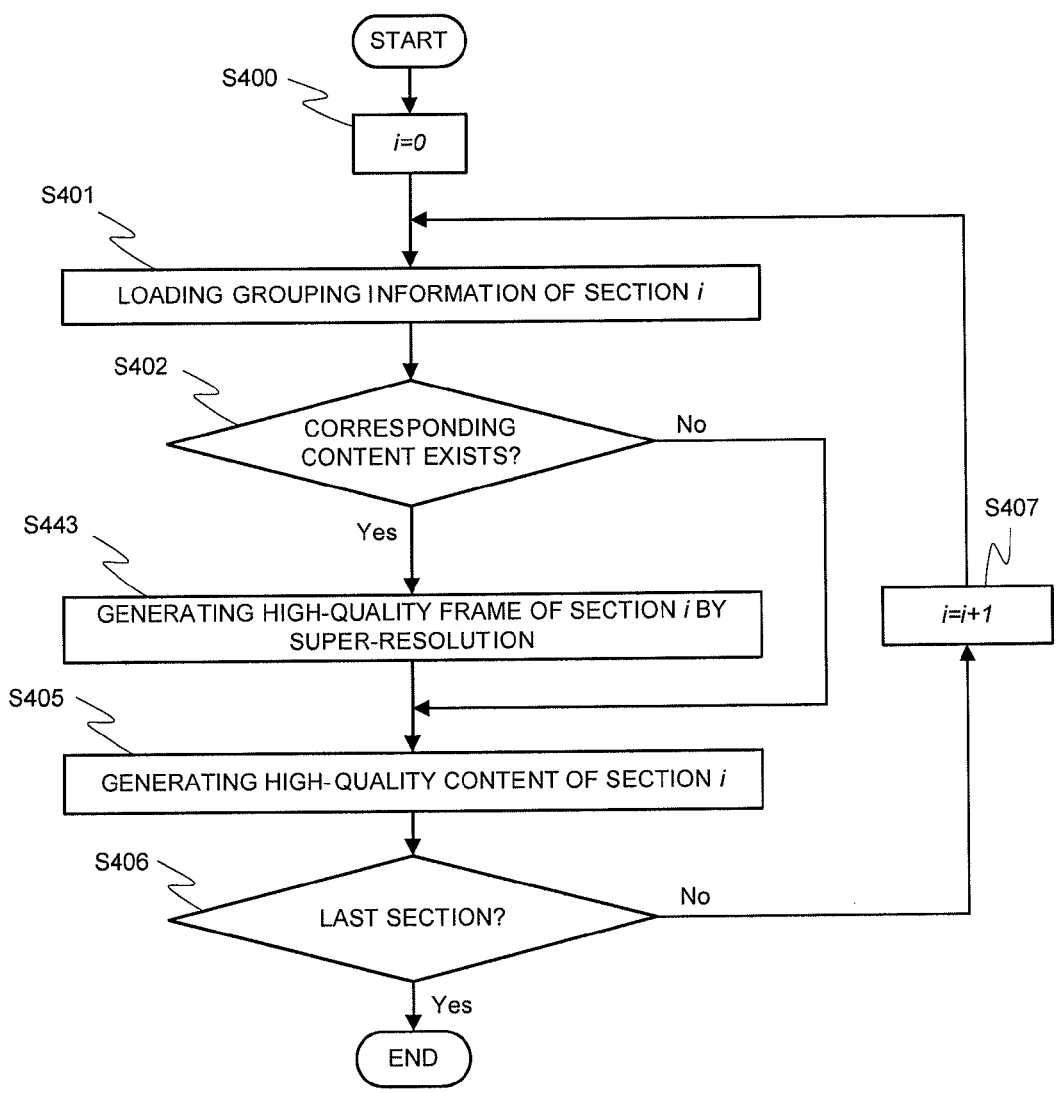
FIG. 6 is a flowchart illustrating a flow of a third exemplary embodiment of the high-quality content generation means 102.

FIG. 6 is a flowchart representing a flow of the process of the third exemplary embodiment of the high-quality content generation means 102. Basically, a step S443 is included therein instead of the step S403 and the step S404 of FIG. 4. The steps other than it are identical to that of a flowchart of FIG. 4, so the step S443 will be described below.

In the step S443, the frame to be outputted is generated by performing a super-resolution process in terms of the corresponding frames of the contents caused to correspond to each other. Specifically, after positioning the pixels for each frame, the output frame is generated by performing the process such as blind deconvolution and sharpening the frame.

The above is an operation of the high-quality content generation means 102 based upon a flowchart shown in FIG. 6.

Next, an operation of the fourth exemplary embodiment of the high-quality content generation means 102 will be explained in details while a reference to figures is made.

Figure 7:
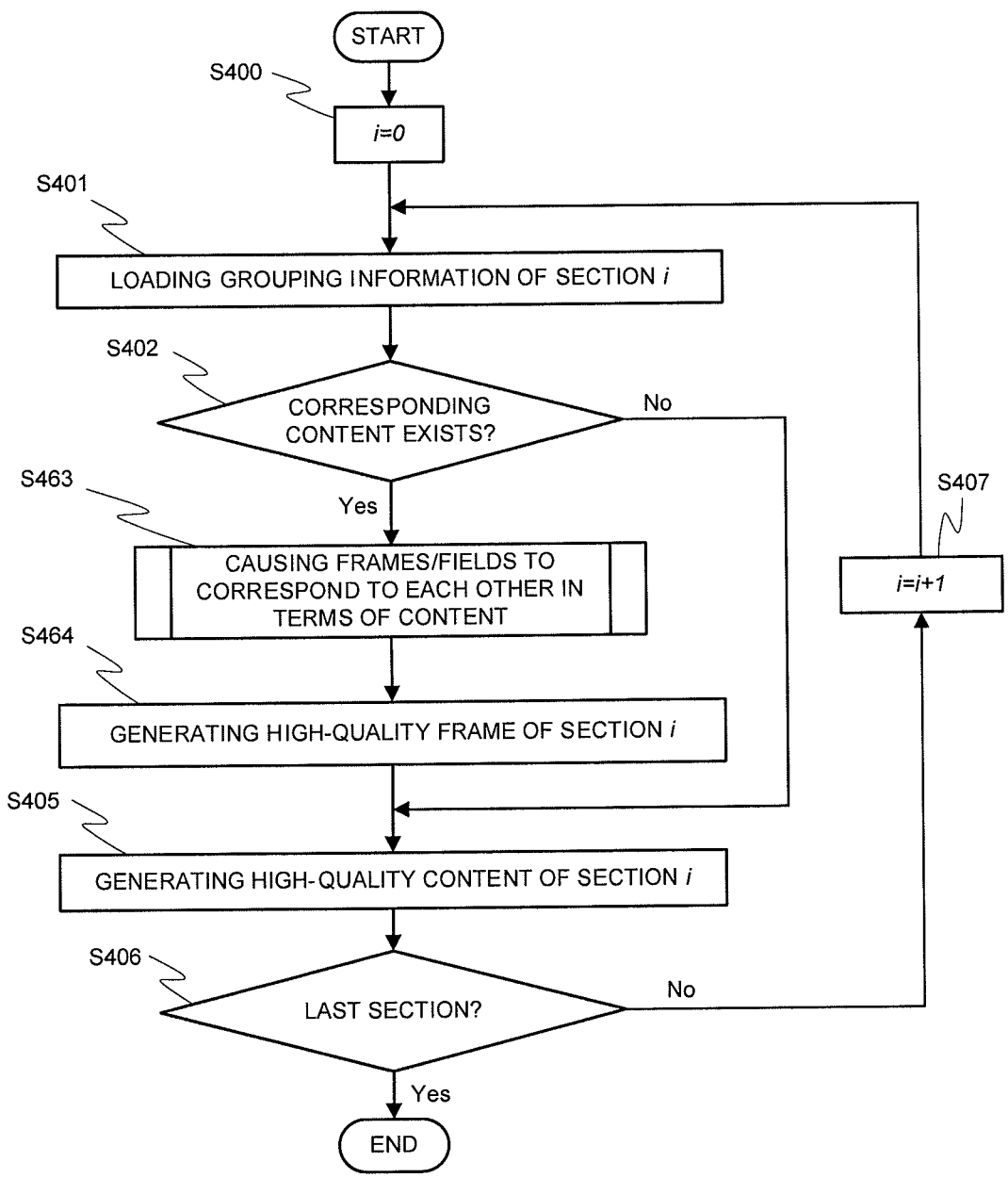
FIG. 7 is a flowchart illustrating a flow of a fourth exemplary embodiment of the high-quality content generation means 102.

FIG. 7 is a flowchart representing a flow of the process of an operation of the fourth exemplary embodiment of the high-quality content generation means 102. Basically, a step S463 and a step S464 are included therein instead of the step S403 and the step S404 of FIG. 4. The steps other than it are identical to that of a flowchart of FIG. 4, so the step S463 and the step S464 will be described below.

In the step S463, the frames/fields are caused to correspond to each other in terms of the content. With the case of the content having a different frame rate, the correspondence relation between the frames obtained by the collation in the identical/derived content grouping means 101 could shift slightly because the contents do not completely coincide with each other. For this, the correspondence relation is adjusted finely to enhance a precision of the collation. These details are described later.

Figure 8:
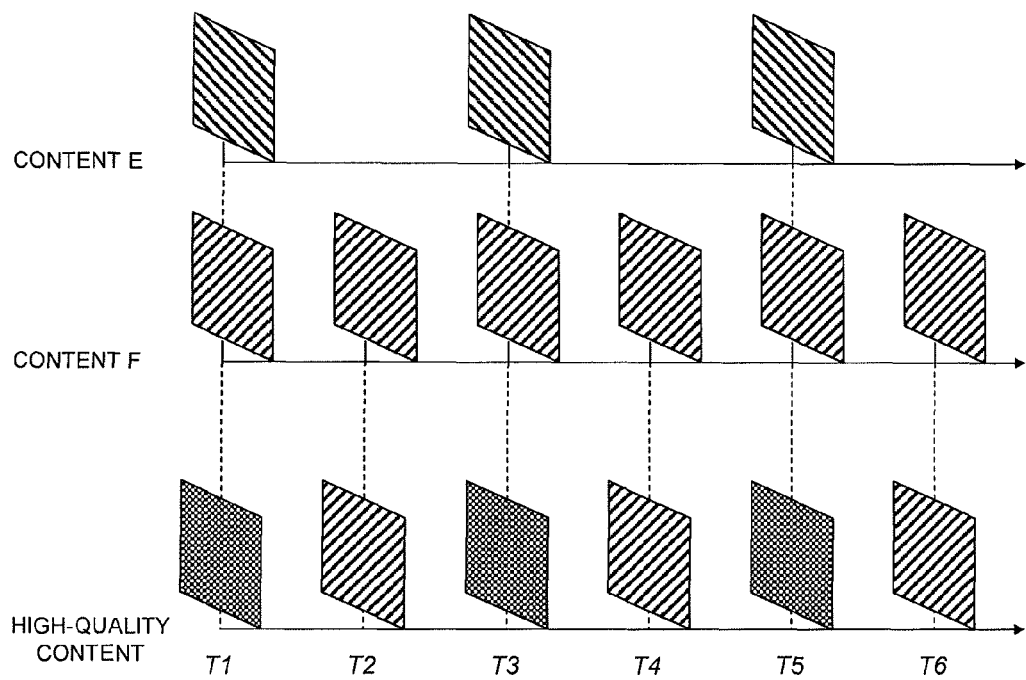
FIG. 8 is a view illustrating a method of generating the high-quality contents when frame rates differ content by content.
Figure 9:
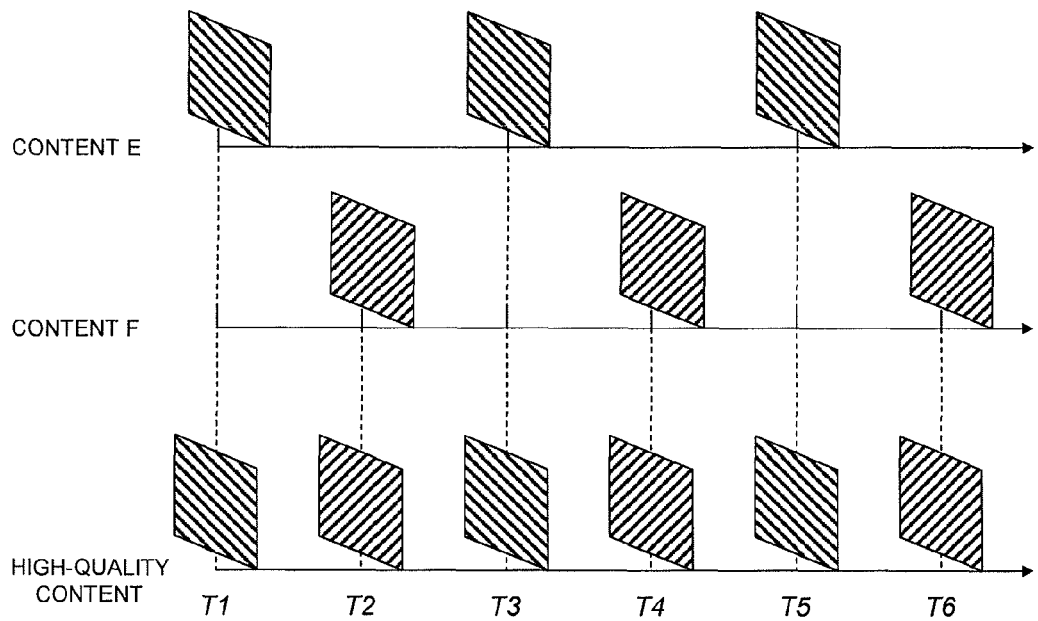
FIG. 9 is a view illustrating a method of generating the high-quality contents when frame rates differ content by content.

Next, in the step S464, the output frames are generated in the section i. FIG. 8 shows the case that a content E and a content F are grouped and the output contents are generated from this. With the case of the contents each having a different frame rate, as apparent from this figure, the number of the corresponding frames changes depending upon the time position of the frame. Thus, with regard to the frame that is outputted at the time when a plurality of the frames of the contents are caused to correspond to each other, the above output frame is generated by employing a plurality of these frames. As a method of generating the output frame, the various methods described above may be employed. On the other hand, in the time position in which a plurality of the frames of the contents are not caused to correspond to each other, namely only one frame exists, the above frame is defined to be the output frame. On the other hand, as shown in FIG. 9, there also exists the case that the frames/fields for the contents do not overlap with each other. In this case, the frames/fields in the respective time positions are employed as they stand as shown in FIG. 9, and are defined as output frames. In such a manner, the frames of the high-quality contents are generated.

Next, the details of the process for the frame/field corresponding in the step S463 will be explained by employing a flowchart.

Figure 10:
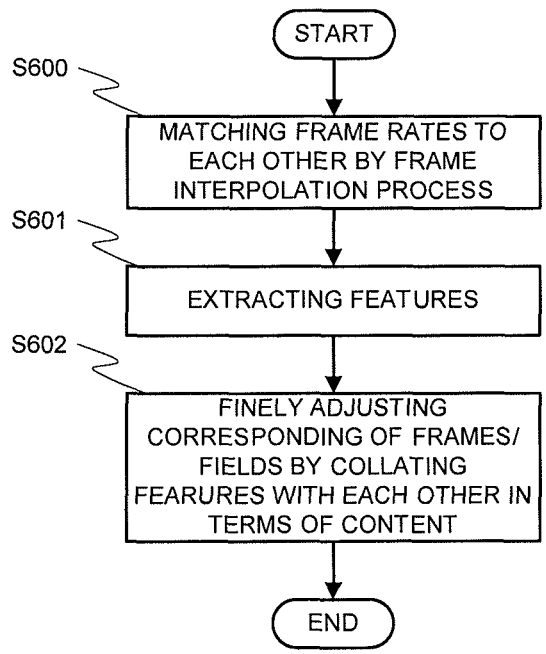
FIG. 10 is a flowchart illustrating an operation of one exemplary embodiment of an inter-content frame/field corresponding step S463 of FIG. 7.

FIG. 10 is a flowchart representing a flow of the process of the step S463.

At first, in a step S600, the frame rates are matched to each other in terms of the content by the frame interpolation process. Specifically, the frame rate is raised to the least common multiple (for example, 30 fps with the case of 10 fps and 15 fps) of the frame rates for the contents. As a frame interpolation technique at this moment, there exist the technique of performing the linear interpolation for the temporally pre and post frames according to the temporal distance, and the technique of compensating motion of objects and generating the interpolated frame from the temporally pre and post frames. At this moment, a part of a background to be covered with the moving object and a part of a newly appearing background exist. The region to be covered can correspond to only the temporally pre frames, and to the contrary, the newly appearing region can correspond to only the temporally post frames. In this case, the pixel values of one region that is caused to correspond are employed as they stand. Additionally, with the case of the content that originally has an interlace structure, the above-mentioned interpolation process is performed in the field structure.

Next, in a step S601, the features of respective frames/fields are extracted. The features to be extracted at this moment could be identical to and could be different from the features employed in the feature extraction means 100. The features sensitive to a shift in the time axis direction are desirably employed because the fine positioning in the time axis direction has to be carried out.

Next, in a step S602, the features are collated with each other in terms of the content to fix the corresponding of the frames/fields. Originally, the positions in the time direction are approximately caused to correspond to each other in terms of the content even though this process is not performed, whereby it is enough to slightly shift the above position pre and post and to select the position having a highest collation score. In such a manner, also for the contents each having a different frame rate, the corresponding of the frames/fields is enabled.

Next, another method for the frame/field corresponding process in the step S463 will be explained by employing a flowchart.

Figure 11:
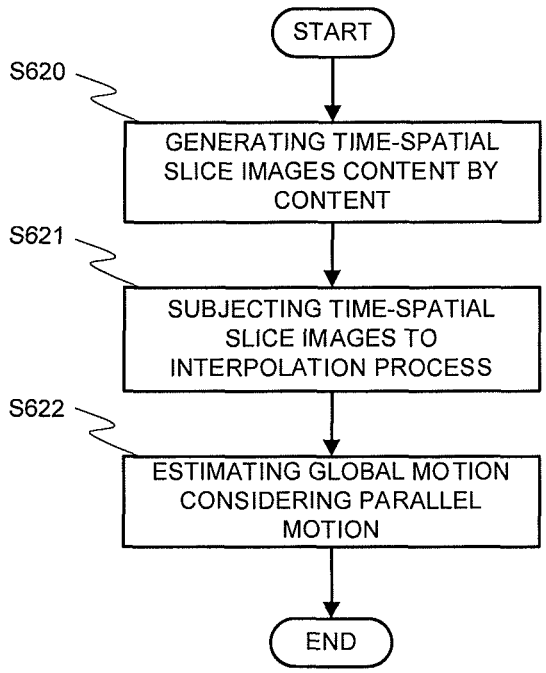
FIG. 11 is a flowchart illustrating an operation of one exemplary embodiment of the inter-content frame/field corresponding step S463 of FIG. 7.

FIG. 11 is a flowchart representing a flow of the process of the step S463.

Figure 12:
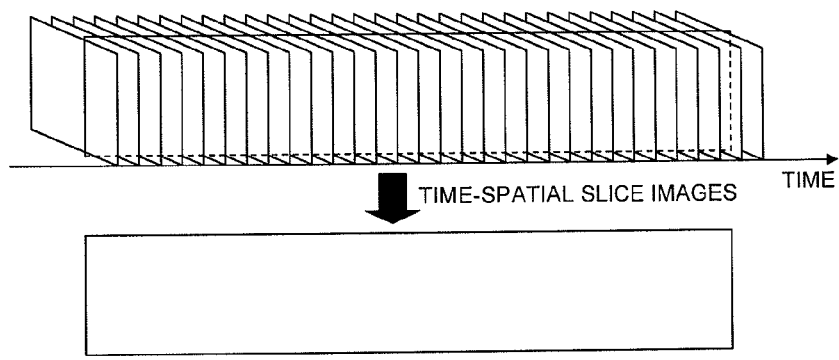
FIG. 12 is a view for explaining time-spatial slice images.

At first, in a step S620, time-spatial slice images of each of the contents are generated. The so-called time-spatial slice images, as shown in FIG. 12, are planes that can be obtained by cutting off the video content by a plane of which a coordinate value in a horizontal direction is constant or a plane of which a coordinate value in a vertical direction is constant when the video content is regarded as three-dimensional data of horizontal component/vertical component/time. While, for convenience, the case of cutting off the video content by a plane of which a coordinate value in a horizontal direction is constant or a plane of which a coordinate value in a vertical direction is constant is described, the images obtained by cutting off the video content by any arbitrary plane may be employed in principle so long as it is parallel to the time axis. FIG. 12 represents planes obtained by cutting off the video content by a plane of which a coordinate value in a horizontal direction is constant. Next, in a step S621, the time-spatial slice images are subjected to the interpolation process. Analogously to the case of the step S600, the interpolation in the time direction is carried out by the least common multiple (for example, 30 fps with the case of 10 fps and 15 fps) of the frame rates for the contents.

Next, in a step S622, global motion estimation considering only parallel motion in the time direction is carried out for the time-spatial slice images subjected to the interpolation process in terms of the content. At this time, the method of a block matching base may be employed, and the method such as Hough Transform may be employed. This allows amount of displacement in the time direction of the time-spatial image to be obtained. The frames/fields may be caused to correspond to each other for the contents according to this value.

The above is an operation of the high-quality content generation means 102 based upon a flowchart shown in FIG. 7.

Next, an operation of the fifth exemplary embodiment of the high-quality content generation means 102 will be explained in details while a reference to figures is made.

Figure 13:
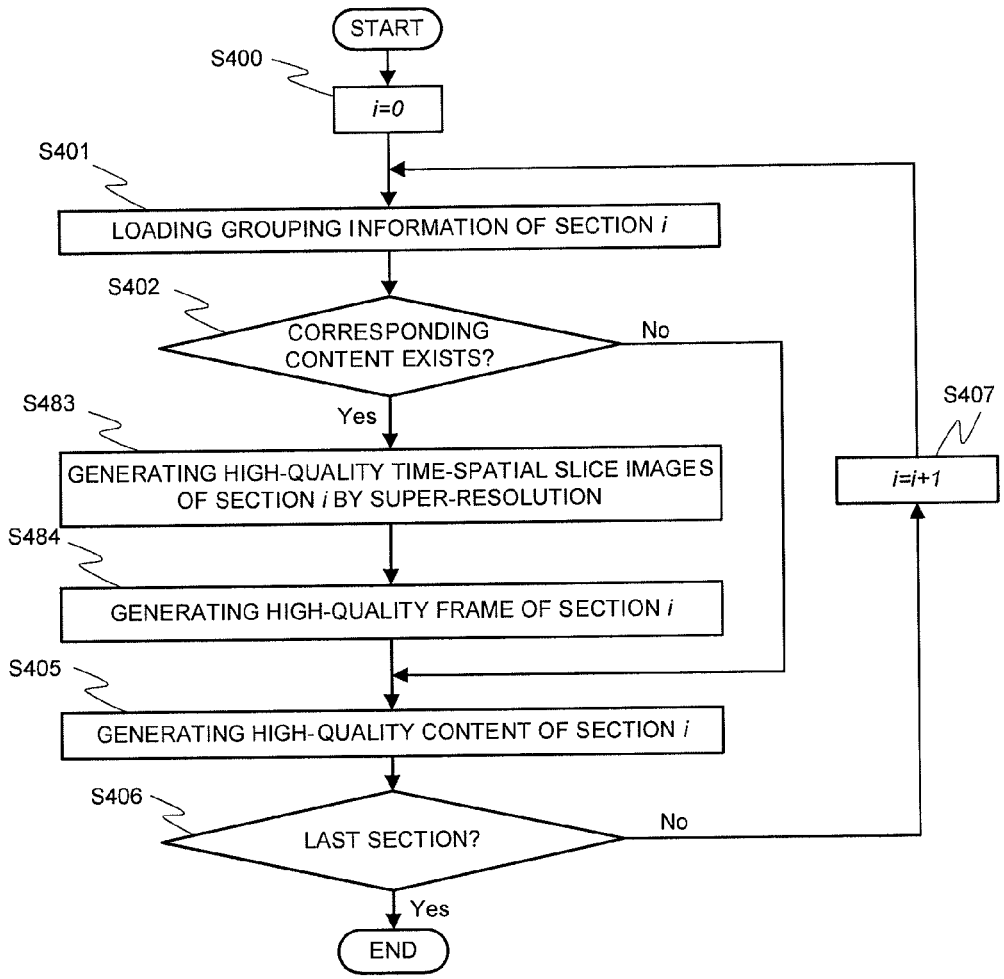
FIG. 13 is a flowchart illustrating a flow of a fifth exemplary embodiment of the high-quality content generation means 102.

FIG. 13 is a flowchart representing a flow of the process of the fifth exemplary embodiment of the high-quality content generation means 102. Basically, a step S483 and a step S484 are included therein instead of the step S403 and the step S404 of FIG. 4. The steps other than it are identical to that of a flowchart of FIG. 4, so the step S483 and the step S484 will be described below.

In the step S483, analogously to the step S620, the time-spatial slice images of each of the contents are generated. And, the high-quality time-spatial slice images are generated by performing the super-resolution process for these time-spatial slice images.

Next, in a step S484, sampling the high-quality time-spatial slice images at the time positions of the output frames allows the output frames to be generated. The pixel values of the output frames are obtained only on a certain straight line equivalent to the cut end from one high-quality time-spatial slice image. For this, the high-quality time-spatial slice images corresponding to arbitrary straight lines parallel to this straight line are generated, and the pixel values of the output frames are calculated. With this, the output frames of the high-quality images are generated.

The above is an operation of the high-quality content generation means 102 based upon a flowchart shown in FIG. 13.

While the operation of the high-quality content generation means 102 was explained above, needless to say, the foregoing methods may be combined and employed. For example, the image qualities of the high-quality contents prepared with a plurality of the foregoing methods may be compared with each other to select the best one. Or, the technique to be employed may be changed section by section or region by region.

An effect of this exemplary embodiment will be explained.

The user can view the high-quality contents even though the user itself does not search for the high-quality contents because this exemplary embodiment is configured to automatically group a plurality of the identical contents and to generate the high-quality contents. Further, with the case of the content having a time axis, the user can view the high-quality content for the entirety of the content without taking labor and time such that the user views the content while making a switchover to the high-quality content one by one because this exemplary embodiment is configured to determine the quality of the contents judged to be identical section by section and to select the content having a best excellent quality, or to generate the highest-quality one.

Next, the second exemplary embodiment will be explained in details by making a reference to the accompanied drawings.

Figure 14:
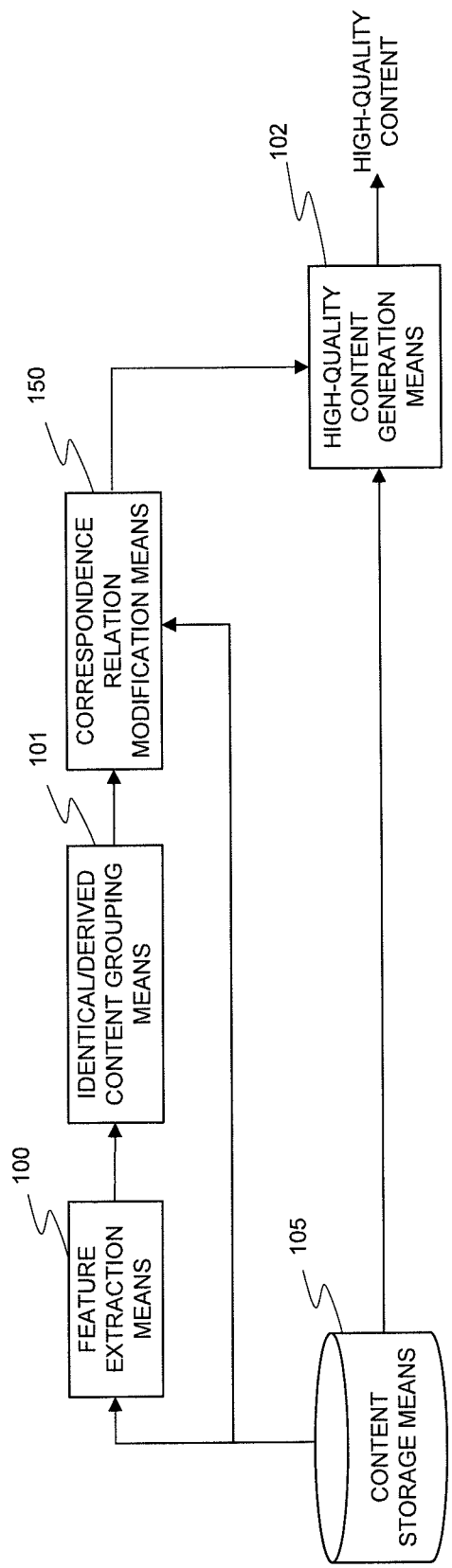
FIG. 14 is a block diagram illustrating the high-quality content generation system in the second exemplary embodiment.

Upon making a reference to FIG. 14, the high-quality content generation system of the second exemplary embodiment is configured of a feature extraction means 100, an identical/derived content grouping means 101, a high-quality content generation means 102, a correspondence relation modification means 150, and a content storage means 105. The content storage means 105, which stores a plurality of the contents, is connected to the feature extraction means 100 and the high-quality content generation means 102.

The feature extraction means 100, into which the contents are inputted from the content storage means 105, obtains the features for the contents and outputs the features to the identical/derived content grouping means 101.

The identical/derived content grouping means 101, into which the features of the contents to be outputted from the feature extraction means 100 are inputted, obtains content link information representing a link relation between the features, and outputs it as grouping information to the correspondence relation modification means 150.

The correspondence relation modification means 150, into which the contents are inputted from the content storage means 105 and the grouping information is inputted from the identical/derived content grouping means 101, modifies the content link information to be included in the grouping information, and outputs the modified grouping information to the high-quality content generation means 102.

The high-quality content generation means 102, into which the grouping information is inputted from the identical/derived content grouping means 101, and the contents are inputted from the content storage means 105, respectively, generates and outputs the high-quality contents.

Next, an operation of the high-quality content generation system of the second exemplary embodiment 1 will be explained.

An operation of the means other than the correspondence relation modification means 150 is similar to that of the first exemplary embodiment shown in FIG. 1. However, the second exemplary embodiment differs from the first exemplary embodiment only in a point that the high-quality content generation means 102 performs the process by employing the grouping information to be outputted not from the identical/derived content grouping means 101 but from the correspondence relation modification means 150.

The correspondence relation modification means 150 modifies the correspondence relation between the contents to be outputted from the identical/derived content grouping means 101. The reason is that the link relation obtained by collating the features with each other could shift from a correct correspondence relation slightly (several frames or so) in some cases. Specifically, the correspondence relation modification means 150 makes a collation again between the contents with the correspondence relation to be outputted from the identical/derived content grouping means 101 taken as a basis, and amends this shift. As this method, the method described in the explanation of the step S463 of a flowchart of FIG. 7 may be employed. The grouping information including the modified correspondence relation is outputted to the correspondence relation modification means 150.

In the second exemplary embodiment, also when a slight error occurs due to the collation of the features with each other, amending the correspondence relation makes it possible to surely generate the high-quality contents.

Additionally, while each part of the high-quality content generation system was configured with hardware in the above-mentioned exemplary embodiments, it may be configured with the information processing apparatus that operates under a program. In this case, the program causes the information processing apparatus to execute the above-described operation of each part.

In accordance with this exemplary embodiment, when a plurality of the contents has been contributed, the user can view the high-quality contents even though the user itself does not search for them. The reason is that the high-quality contents are generated by employing a plurality of the contributed identical contents and are presented to the user. This enables the user to view the high-quality contents without having a hard time.

Further, this exemplary embodiment enables the user to view the high-quality contents from beginning to end. The reason is that determining the quality of the content section by section, and selecting one having a highest quality or generating the high-quality one from a plurality of the identical contents allows the high-quality of the content to be realized as a whole, and the high-quality content to be presented to the user. For this, the user can view the high-quality content for the entirety of the content without taking labor and time such that the user views the content while making a switchover to the high-quality content one by one.

Above, although the exemplary embodiment has been described, the first mode of the present invention is characterized in that a high-quality content generation system comprising: a feature extraction means for extracting features of contents from a plurality of the contents; a content grouping means for collating the features of a plurality of the contents extracted by said feature extraction means with each other, grouping the identical contents and the derived contents produced by using the above identical contents to be included in said plurality of the contents, and calculating identical/derived content grouping information; and a high-quality content generation means for selecting the contents to be grouped with said identical/derived content grouping information from among said plurality of the contents, and generating the contents of which a quality is more excellent by employing the selected contents.

The second mode of the present invention, in the above-mentioned mode, is characterized in that said content has a time axis; and said content grouping means groups the identical/derived contents for each time section by said collation, and calculates said identical/derived content grouping information; and said high-quality content generation means generates the contents of which a quality is more excellent time section by time section by employing said selected contents.

The third mode of the present invention, in the above-mentioned mode, is characterized in that said content is music or video.

The fourth mode of the present invention, in the above-mentioned mode, is characterized in that said feature of the content includes at least one of a visual feature and an audio feature.

The fifth mode of the present invention, in the above-mentioned mode, is characterized in that said high-quality content generation means evaluates the quality of said selected contents time section by time section, compares the qualities with each other in terms of the time section corresponding to the identical section of said selected content partners, and selects and pieces together the time sections of the high-quality contents, thereby to generate the contents of which a quality is more excellent.

The sixth mode of the present invention, in the above-mentioned mode, is characterized in that said high-quality content generation means determines the evaluation of the quality for each time section by a coding bit amount to be assigned to the above time section, and a coding technique.

The seventh mode of the present invention, in the above-mentioned mode, is characterized in that said high-quality content generation means determines the evaluation of the quality for each time section by an evaluation index for evaluating magnitude of coding noise.

The eighth mode of the present invention, in the above-mentioned mode, is characterized in that said high-quality content generation means evaluates the quality of said selected contents for each time section and for each region within a frame, compares the qualities with each other in terms of the time section corresponding to the identical section of said selected content partners, and selects and pieces together the time sections and the regions within the frame of the high-quality contents, thereby to generate the contents of which a quality is more excellent.

The ninth mode of the present invention, in the above-mentioned mode, is characterized in that said high-quality content generation means determines the evaluation of the quality for each region within the frame by a coding bit amount to be assigned to the above region within the frame, and a coding method.

The tenth mode of the present invention, in the above-mentioned mode, is characterized in that said high-quality content generation means determines the evaluation of the quality for each region within the frame by an evaluation index for evaluating magnitude of coding noise.

The eleventh mode of the present invention, in the above-mentioned mode, is characterized in that said evaluation index for evaluating magnitude of the coding noise is a coding parameter for specifying coarseness of quantization.

The twelfth mode of the present invention, in the above-mentioned mode, is characterized in that said high-quality content generation means generates the contents of which a quality is more excellent by employing the content having a highest resolution when resolutions of said selected contents differ from each other.

The thirteenth mode of the present invention, in the above-mentioned mode, is characterized in that said high-quality content generation means generates the contents of which a quality is more excellent by performing a statistics process for pixel values in terms of the corresponding frames and generating the high-quality frames.

The fourteenth mode of the present invention, in the above-mentioned mode, is characterized in that said high-quality content generation means generates the contents of which a quality is more excellent by generating high-quality frames by employing a super-resolution technology for corresponding frames when resolutions of said selected contents differ from each other.

The fifteenth mode of the present invention, in the above-mentioned mode, is characterized in that said high-quality content generation means generates the contents of which a quality is more excellent by employing the content having a highest frame rate when frame rates of said selected contents differ from each other.

The sixteenth mode of the present invention, in the above-mentioned mode, is characterized in that, when frame rates of said selected contents differs from each other, said high-quality content generation means generates the contents of which a quality is more excellent by, in a case where frames or fields that correspond between said selected contents exist in a plural number, selecting the frame or the field having a most excellent quality, out of them, or performing a statistic process for said corresponding frames or fields, thereby to generate the frames or the field, and by, in a case where frames or fields that correspond between said selected contents do not exist in a plural number, selecting the above frame or field.

The seventeenth mode of the present invention, in the above-mentioned mode, is characterized in that said high-quality content generation means determines the evaluation of the quality for each frame or field by an evaluation index for evaluating magnitude of coding noise.

The eighteenth mode of the present invention, in the above-mentioned mode, is characterized in that, when frame rates of said selected contents differs from each other, said high-quality content generation means generates the contents of which a quality is more excellent after adjusting the frames or fields caused to correspond to each other for said contents by generating time-spatial slice images for each of said selected contents, and estimating motion components parallel to a time axis direction for the corresponding time-spatial slice images in terms of said selected content.

The nineteenth mode of the present invention, in the above-mentioned mode, is characterized in that, when frame rates of said selected contents differs from each other, said high-quality content generation means generates the contents of which a frame rate is high by generating time-spatial slice images for each of said selected contents, generating the high-quality time-spatial slice images by employing a super-resolution technology for the corresponding time-spatial slice images in terms of said selected content, and re-sampling said high-quality time-spatial slice images.

The twentieth mode of the present invention, in the above-mentioned mode, is characterized in that the high-quality content generation system comprising a correspondence relation modification means for selecting from among said plurality of the contents the contents to be grouped with the identical/derived content grouping information to be outputted from said content grouping means, modifying a correspondence relation of the section in terms of said selected content based upon said identical/derived content grouping information, and outputting modified identical/derived content grouping information, wherein said high-quality content generation means generates has said modified identical/derived content grouping information as an input instead of said identical/derived content grouping information.

The twenty-first mode of the present invention is characterized in that a high-quality content generation method comprising: a feature extraction step of extracting features of contents from a plurality of the contents; a content grouping step of collating the features of said plurality of the extracted contents with each other, grouping the identical contents and the derived contents produced by using the above identical contents to be included in said plurality of the contents, and calculating identical/derived content grouping information; and a high-quality content generation step of selecting the contents to be grouped with said identical/derived content grouping information from among said plurality of the contents, and generating the contents of which a quality is more excellent by employing the selected contents.

The twenty-second mode of the present invention, in the above-mentioned mode, is characterized in that said content has a time axis; and said content grouping step groups the identical/derived contents for each time section by said collation, and calculates said identical/derived content grouping information; and said high-quality content generation step generates the contents of which a quality is more excellent time section by time section by employing said selected contents.

The twenty-third mode of the present invention, in the above-mentioned mode, is characterized in that the high-quality content generation method comprising a correspondence relation modification step of selecting from among said plurality of the contents the contents to be grouped with the identical/derived content grouping information to be calculated in said content grouping step, modifying a correspondence relation of the section in terms of said selected content based upon said identical/derived content grouping information, and calculating modified identical/derived content grouping information, wherein said high-quality content generation step employs said modified identical/derived content grouping information instead of said identical/derived content grouping information.

The twenty-fourth mode of the present invention is characterized in that a high-quality content generation program for causing an information processing apparatus to execute: a feature extraction process of extracting features of contents from a plurality of the contents; a content grouping process of collating the features of said plurality of the extracted contents with each other, obtaining the identical contents and the derived contents produced by using the above identical contents to be included in said plurality of the contents, grouping the identical/derived contents, and calculating identical/derived content grouping information; and a high-quality content generation process of selecting the contents to be grouped with said identical/derived content grouping information from among said plurality of the contents, and generating the contents of which a quality is more excellent by employing the selected contents.

The twenty-fifth mode of the present invention, in the above-mentioned mode, is characterized in that said content has a time axis; wherein said content grouping process groups the identical/derived contents for each time section by said collation, and calculates said identical/derived content grouping information; and wherein said high-quality content generation process generates the contents of which a quality is more excellent time section by time section by employing said selected contents.

The twenty-sixth mode of the present invention, in the above-mentioned mode, is characterized in that said high-quality content generation program causing the information processing apparatus to execute a correspondence relation modification process of selecting from among said plurality of the contents the contents to be grouped with the identical/derived content grouping information to be calculated in said content grouping process, modifying a correspondence relation of the section in terms of said selected content based upon said identical/derived content grouping information, and calculating modified identical/derived content grouping information, wherein said high-quality content generation process employs said modified identical/derived content grouping information instead of said identical/derived content grouping information.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-167345, filed on Jun. 26, 2008, the disclosure of which is incorporated herein in its entirety by reference.

INDUSTRIAL APPLICABILITY

The present invention is applicable to fields such as a system and a program of generating the high-quality contents by employing the contents accessible from the network, and presenting them to the user. Further, the foregoing field is not limited to the network, and the present invention is similarly applicable to the contents stored in an identical hard disc recorder so long as the identical/derived contents exist in it.

REFERENCE SIGNS LIST 100 feature extraction means
101 identical/derived content grouping means
102 high-quality content generation means
105 content storage means
150 correspondence relation modification means

The invention claimed is:
1. A high-quality content generation system comprising:
a feature extractor configured to extract features of contents from a plurality of the contents;
a content grouping unit configured to collate the features of a plurality of the contents extracted by said feature extractor, to group identical contents with derived contents produced by using the identical contents to be included in said plurality of the contents, and to calculate identical/derived content grouping information; and
a high-quality content generator configured to select the contents to be grouped with said identical/derived content grouping information from among said plurality of the contents, and to generate contents for which a quality is improved by employing the selected contents,
wherein the contents comprise at least one from among digitalized multimedia content, picture content, and video content.

2. A high-quality content generation system according to claim 1:
   wherein each of said contents is associated with a respective time section on a time axis;
   wherein said content grouping unit is further configured to group the identical/derived contents for each time section by said collation, and to calculate said identical/derived content grouping information; and
   wherein said high-quality content generator is further configured to generate the contents for which the quality is improved for each time section by employing said selected contents.

3. A high-quality content generation system according to claim 2, wherein said contents include at least one from among music and video.

4. A high-quality content generation system according to claim 3, wherein said features of said contents includes at least one of a visual feature and an audio feature.

5. A high-quality content generation system according to claim 2, wherein said high-quality content generator is further configured to evaluate a quality of said selected contents for each respective time section, to compare the evaluated quality for each respective time section with an evaluated quality of a corresponding time section which has been grouped as having identical contents of said selected contents, and to select and combine the time sections of the high-quality contents based on a result of the comparing.

6. A high-quality content generation system according to claim 5, wherein said high-quality content generator is further configured to determine the evaluation of the quality for each respective time section by using a respective coding bit amount to be assigned to the respective time section, and to determine a corresponding coding technique.

7. A high-quality content generation system according to claim 5, wherein said high-quality content generator is further configured to determine the evaluation of the quality for each respective time section by using an evaluation index for evaluating a magnitude of coding noise.

8. A high-quality content generation system according to claim 2, wherein said high-quality content generator is further configured to evaluate a quality of said selected contents for each respective time section and for each region within a frame, to compare the evaluated quality for each respective time section with an evaluated quality of a corresponding time section which has been grouped as having identical contents of said selected contents, and to select and combine the time sections and the regions within the frame of the high-quality contents based on a result of the comparing.

9. A high-quality content generation system according to claim 8, wherein said high-quality content generator is further configured to determine the evaluation of the quality for each region within the frame by using a respective coding bit amount to be assigned to the respective region within the frame, and to determine a corresponding coding method.

10. A high-quality content generation system according to claim 8, wherein said high-quality content generator is further configured to determine the evaluation of the quality for each region within the frame by using an evaluation index for evaluating a magnitude of coding noise.

11. A high-quality content generation system according to claim 7, wherein said evaluation index for evaluating magnitude of the coding noise includes a coding parameter for specifying a coarseness of quantization.

12. A high-quality content generation system according to claim 2, wherein said high-quality content generator is further configured to generate the contents for which the quality is improved by employing a content having a highest resolution when resolutions of said selected contents vary.

13. A high-quality content generation system according to claim 2, wherein said high-quality content generator is further configured to generate the contents for which the quality is improved by performing a statistics process for pixel values with respect to the corresponding frames and to generate the high-quality frames based on a result of the performing the statistics process.

14. A high-quality content generation system according to claim 2, wherein said high-quality content generator is further configured to generate the contents for which the quality is improved by generating high-quality frames by employing a super-resolution technology for corresponding frames when resolutions of said selected contents vary.

15. A high-quality content generation system according to claim 2, wherein said high-quality content generator is further configured to generate the contents for which the quality is improved by employing a content having a highest frame rate when frame rates of said selected contents vary.

16. A high-quality content generation system according to claim 2, wherein, when frame rates of said selected contents vary, said high-quality content generator is further configured to generate the contents for which the quality is improved by, in a case where frames or fields that correspond between said selected contents exist in a plural number, selecting, from said corresponding frames or fields, a frame or a field having a highest quality, or performing a statistics process for said corresponding frames or fields in order to generate the frame or the field, and by, in a case where frames or fields that correspond between said selected contents do not exist in a plural number, selecting the frame or the field having the highest quality from among said corresponding frames or fields.

17. A high-quality content generation system according to claim 16, wherein said high-quality content generator is further configured to determine the evaluation of the quality for each frame or field by using an evaluation index for evaluating a magnitude of coding noise.

18. A high-quality content generation system according to claim 16, wherein, when frame rates of said selected contents vary, said high-quality content generator is further configured to generate the contents or which the quality is improved after adjusting the corresponding frames or fields for said contents by generating time-spatial slice images for each of said selected contents, and by estimating motion components parallel to a time axis direction for the corresponding time-spatial slice images with respect to said selected contents.

19. A high-quality content generation system according to claim 2, wherein, when frame rates of said selected contents vary, said high-quality content generator is further configured to generate contents for which a frame rate is high by generating time-spatial slice images for each of said selected contents, generating high-quality time-spatial slice images by employing a super-resolution technology for the corresponding time-spatial slice images with respect to said selected contents, and re-sampling said high-quality time-spatial slice images.

20. A high-quality content generation system according to claim 2, further comprising a correspondence relation modification unit configured to select, from among said plurality of the contents, the contents to be grouped with the identical/derived content grouping information calculated by said content grouping unit, to modify a correspondence relation of each time section with respect to said selected contents based upon said identical/derived content grouping information, and to output modified identical/derived content grouping information, wherein said high-quality content generator is further configured to generate said modified identical/derived content grouping information.

21. A high-quality content generation method comprising:
extracting features of contents from a plurality of contents;
collating the extracted features, grouping identical contents and derived contents produced by using the identical contents to be included in said plurality of the contents, and calculating identical/derived content grouping information; and
selecting the contents to be grouped with said identical/derived content grouping information from among said plurality of the contents, and generating contents for which a quality is improved by employing the selected contents,
wherein the contents comprise at least one from among digitalized multimedia content, picture content, and video content.

22. A high-quality content generation method according to claim 21:
wherein each of said contents is associated with a respective time section on a time axis;
wherein the grouping includes grouping the identical/derived contents for each time section by said collation, and calculating said identical/derived content grouping information; and
wherein the generating includes generating the contents for which the quality is improved for each time section by employing said selected contents.

23. A high-quality content generation method according to claim 21, further comprising:
selecting, from among said plurality of the contents, the contents to be grouped with the calculated identical/derived content grouping information,
modifying a correspondence relation of each time section with respect to said selected contents based upon said identical/derived content grouping information, and
calculating modified identical/derived content grouping information.

24. A non-transitory computer readable storage medium storing a high-quality content generation program for causing an information processing apparatus to execute a method comprising:
extracting features of contents from a plurality of contents;
collating the extracted features, obtaining identical contents and derived contents produced by using the identical contents to be included in said plurality of the contents, grouping the obtained identical contents and the obtained derived contents, and calculating identical/derived content grouping information; and
selecting the contents to be grouped with said identical/derived content grouping information from among said plurality of the contents, and generating contents for which a quality is improved by employing the selected contents,
wherein the contents comprise at least one from among digitalized multimedia content, picture content, and video content.

25. A non-transitory computer readable storage medium storing a high-quality content generation program according to claim 24:
wherein each of said contents is associated with a respective time section on a time axis;
wherein the grouping includes grouping the obtained identical contents and the obtained derived contents for each time section by said collation, and calculating said identical/derived content grouping information; and
wherein the generating includes generating the contents for which the quality is improved for each time section by employing said selected contents.

26. A non-transitory computer readable storage medium storing a high-quality content generation program according to claim 24, wherein the method further comprises:
selecting, from among said plurality of the contents, the contents to be grouped with the calculated identical/derived content grouping information,
modifying a correspondence relation of each time section with respect to said selected contents based upon said identical/derived content grouping information, and
calculating modified identical/derived content grouping information.

* * * * *